US006789593B1

(12) United States Patent
Aono et al.

(10) Patent No.: US 6,789,593 B1
(45) Date of Patent: Sep. 14, 2004

(54) HOLE PUNCHER AND REINFORCER

(75) Inventors: Isao Aono, Higashiyatushiro, CA (US); John Hui, 7373 Hunt Ave., Garden Grove, CA (US) 92841

(73) Assignee: John Hui, Santa Ana, CA (US)

( * ) Notice: Subject to any disclaimer, the term of this patent is extended or adjusted under 35 U.S.C. 154(b) by 0 days.

(21) Appl. No.: 10/283,959

(22) Filed: Oct. 29, 2002

(51) Int. Cl.[7] ............................ B26D 7/00; B32B 31/00

(52) U.S. Cl. ....................... 156/513; 156/515; 156/530; 156/564; 156/565

(58) Field of Search ................................ 156/251, 515, 156/530, 252, 299, 513, 564, 565, 570, 514

(56) References Cited

U.S. PATENT DOCUMENTS

| | | | | |
|---|---|---|---|---|
| 2,353,232 A | | 7/1944 | Greene | |
| 2,441,821 A | | 5/1948 | Kendall | |
| 2,512,822 A | | 6/1950 | Barsh | |
| 2,561,387 A | | 7/1951 | Forese | |
| 2,583,944 A | | 1/1952 | Hirszson et al. | |
| D193,231 S | | 7/1962 | Klein | |
| 3,898,919 A | | 8/1975 | Grimaldi, Jr. | |
| 3,925,144 A | | 12/1975 | Lowe et al. | |
| 4,007,653 A | | 2/1977 | Cady | |
| 4,072,554 A | | 2/1978 | McKibben | |
| 4,289,565 A | | 9/1981 | Wilkins | |
| 4,310,379 A | | 1/1982 | Harrison | |
| 4,713,995 A | * | 12/1987 | Davi | 83/167 |
| 4,746,394 A | | 5/1988 | Sueta et al. | |
| 4,826,561 A | | 5/1989 | Carroll | |
| 4,909,893 A | | 3/1990 | Lee | |
| 5,188,694 A | | 2/1993 | Hashida et al. | |
| 5,340,229 A | * | 8/1994 | Schwartzman | 402/4 |
| 5,658,421 A | | 8/1997 | Carroll | |
| 6,206,070 B1 | * | 3/2001 | Salmon | 156/513 |
| 6,397,652 B1 | * | 6/2002 | Sollami | 72/360 |

FOREIGN PATENT DOCUMENTS

WO PCT/FR88/00134 9/1988

* cited by examiner

*Primary Examiner*—Richard Crispino
*Assistant Examiner*—Cheryl N. Hawkins
(74) *Attorney, Agent, or Firm*—Charles H. Thomas

(57) ABSTRACT

A combination hole punching and reinforcing device for punching holes in sheets of paper and other sheet materials applies flat reinforcement rings about holes formed in those sheets concurrently as the holes are formed. The device employs a die punch, which is preferably configured as a disposable item that is detachable from the lower end of the punching ram. The die punch is configured with a punching tip at its lower extremity and a shank that is preferably narrower than the punching tip. A plurality of reinforcement rings are stacked one atop each other and are carried upon a shoulder formed at the demarcation between the die punch tip and the die punch shank. A transverse pressure plate located atop the shank applies pressure to sequentially affix the lowermost reinforcement ring in the stack to a sheet of paper concurrently with the formation of an aperture through that sheet. Each reinforcement ring is formed with a pressure-sensitive adhesive on its undersurface and an upper surface treated with a silicone release coating. Therefore, once each lowermost reinforcement ring is attached about an aperture formed in a sheet of paper, the remaining reinforcement rings in the stack are lifted by the die punch and detached from the lowermost ring.

20 Claims, 10 Drawing Sheets

HOLE PUNCHER AND REINFORCER

BACKGROUND OF THE INVENTION

1. Field of the Invention

The present invention relates to a combination hole puncher and reinforcer by means of which holes are punched in sheets of material, such as paper, and concurrently reinforced with flat, annular rings around the holes.

2. Description of the Prior Art

In offices throughout the world hole punching devices have been utilized for many years so as to punch holes in sheets of paper, and sometimes plastic sheets, to allow those sheets to be secured in files. Sheets of paper are often punched at the top with a pair of holes that allow them to be secured at the top to files using pronged fasteners. Other types of hole punchers are used to punch holes in papers and other sheets of material along the sides to allow them to be secured in ring binders.

A problem that has persisted through the years is that considerable stress is often applied to the structure of papers fastened in files in the area immediately surrounding the punched holes. The papers then tear through the short distance of material between the holes and the edges of the sheets of paper near which they are formed. When this occurs the sheets will no longer remain in the file.

One system for remedying this situation that has been available for many years is the use of flat, annular reinforcing rings that may secured to the areas surrounding the punched holes. These reinforcing rings are typically formed of a material of greater strength than the paper in which the holes are punched. The reinforcing rings are coated with either a moisture-sensitive or pressure-sensitive adhesive and are applied to the sheet of paper or other material once the holes have been punched.

The principal problem with this prior arrangement is that it has historically been performed manually. The task of reinforcing punched holes in the hundreds, and even thousands, of sheets papers that are secured in files by the manual application of such reinforcing rings is often so labor intensive as to be impractical. Consequently, this system of reinforcement, while used to some extent, is not prevalent.

Various hole puncher and reinforcer devices have been created in attempts to provide alternative way of reinforcing the structure of sheets of paper around punched holes therein. Numerous machines have been fabricated that draw segments of adhesive tape from rolls and secure them to sheets of paper or plastic contemporaneously with the perforation of those sheets. When such devices operate properly, the sheets of paper are provided with short sections of tape at the edges of the papers in which the holes are formed. Holes are punched through both the segments of tape and the underlying paper or other sheet material.

These tape reinforcement devices also have, to a large extent, proved impractical. The feed mechanisms for the tape often jam and the tape often adheres to parts of the punching machines as it is fed toward the location on the sheets of paper at which it is to be applied.

Another problem with systems employing adhesive tape to reinforce the areas about punched holes is that the punch mechanism must penetrate not only the paper in which the fastening apertures are to be formed, but also the tape as well. Since the tape is coated with pressure-sensitive adhesive, articles of adhesive are transferred to the punch mechanism. This creates a certain gumminess in the punch mechanism that reduces the effectiveness of the punch in creating apertures. Also a build-up of adhesive in the punch mechanism contributes to the fouling of the tape as the tape is fed into position to be pressed against the paper.

SUMMARY OF THE INVENTION

The present invention is a hole puncher and reinforcer device that automatically applies a reinforcement about a hole that is punched in a sheet of material, but which avoids the use of adhesive tape drawn from a roll for this purpose. As a consequence, the hole punching and reinforcing device of the present invention avoids the problem of fouling of a feed system with adhesive transferred from a roll of tape.

A further feature of the invention is that the reinforcer application mechanism is extremely simple in construction. Unlike conventional combination hole punchers and reinforcers, the present invention does not require any elaborate, relative complex, and expensive tape feed mechanisms. To the contrary, the only mechanism that is required for applying reinforcement about the circumference of the holes as they are punched through the sheet material is a die punch upon which the flat reinforcement rings are stacked one atop another between a broadened punching tip located at the lower extremity of the die punch shank and a pressure plate locate above the stack of reinforcement rings.

The reinforcement rings are typically constructed as flat, annular rings having a circular outer periphery and a central opening therethrough, also circular in shape. The rings are stacked one above another and have pressure-sensitive adhesive on their lower faces and an adhesive-resistant coating on their upper faces.

Preferably, the die punch is comprised of a disposable punch and ring carrier magazine mechanism that is detachable from the lower end of a punching ram. The upper extremity of the detachable die punch and magazine may be screwed onto or otherwise removably attached to the lower end of a ram that moves through a laterally constraining guide. A plurality of reinforcement rings are stacked, on atop another, between a flat pressure plate disposed atop the shank of the die punch and magazine structure and the punching tip of the die punch. The reinforcement rings rest upon the shoulder that exists at the transition between the die punch magazine shank and the slightly broadened die punch tip. With the operation of the punch actuating lever the ram is forced downwardly. The pressure plate of the die punch presses the stack of reinforcement rings downwardly from above. Since the undersurfaces of the reinforcement rings are coated with pressure-sensitive adhesive, the sticky undersurface of the lowermost reinforcement ring is pressed against a sheet of material, such as paper, through which the slightly broadened die punch tip has just been forced.

The broadened die punch tip creates a hole through the sheet of paper, while the lowermost reinforcement ring is pressed against the upper surface of the sheet of paper. The punch ram is normally spring biased upwardly, so that when the operating lever is released, the ram is retracted upwardly, drawing with it the die punch magazine. Even though the broadened punching tip of the reinforcer magazine is slightly larger in diameter than the circular, inner circumference of the lowermost reinforcement ring, the reinforcement ring is sufficiently flexible so that it yields at its inner circumference to allow the slightly larger diameter punching tip to pass upwardly through its central opening.

The force of adhesion between the pressure-sensitive adhesive on the undersurface of the lowermost reinforcement ring and the upper surface of the paper surrounding the hole punched is sufficient to prevent the reinforcement ring from being lifted upwardly with the punching tip. However, since the upper surface of the reinforcement rings are treated so as to be resistant to adhesive, the adhesive bond between the undersurface of the reinforcement ring directly above the lowermost reinforcement ring and the upper surface of the lowermost reinforcement ring is quite weak. Consequently, as the punching tip is retracted upwardly through the central opening of the lowermost reinforcement ring, the weak bond between the upper surface of the lowermost reinforcement ring and the undersurface of the reinforcement ring located immediately thereabove is broken. The reinforcement ring located immediately above the lowermost ring, as well as all the rings stacked above that ring, are drawn upwardly clear of the lowermost ring and clear of the sheet of paper to which the lowermost ring remains attached.

With each operation of the punch and reinforcement mechanism, the reinforcement ring left at the bottom of the stack with the retraction of the punching ram becomes the lowermost ring and is then attached to the upper surface of another sheet of paper with the next sequential operation of the ram. Once all of the reinforcement rings have been applied to sheets of paper, or other material about the holes punched therein, the combination die punch and ring magazine is discarded.

Preferably, the detachable die punch is formed of an inexpensive, disposable material, such as hard plastic. It must be hard enough so that its punching tip is sharp enough to sever chads from paper or other sheet material. The reinforcement rings may also be formed of plastic, such a polyethylene terephthalate (PET). Preferably also, the upper surface of the reinforcement ring is made adhesive resistant by the application of a silicone layer. The undersurface of the PET reinforcement ring is coated with a conventional, pressure-sensitive adhesive of the type utilized on postage stamps, filing labels, and other types of articles which are secured to flat surfaces by pressure-sensitive adhesive.

In one broad aspect the present invention may be considered to be a punching and reinforcement apparatus for a combination hole puncher and reinforcer for punching holes in sheets of material and for concurrently applying reinforcement to those sheets of material about the holes therein. The invention is a lower die punch member having a transverse pressure plate with a cylindrical shank depending therefrom and a stack of reinforcement rings disposed on the cylindrical shank. Each reinforcement ring has an undersurface coated with a pressure-sensitive adhesive and an adhesive resistant upper surface.

The punching tip of the die punch has a sharp, cutting edge that severs a circular chad from a sheet of paper or other sheet material positioned therebeneath. The die punch tip can be constructed to have the same diameter as the shank. Ideally, since a weak adhesive bond exists between the upper surface of the lowermost reinforcement ring, and between all other reinforcement rings in the stack located thereabove, a stack of reinforcement rings may stay intact, releasing only the lowermost ring as its adhesive coated surface is pressed against the surface of the paper or other sheet of material to be punched and reinforced. As the lowermost ring is pressed against the sheet of material, the relatively strong bond between the adhesive coating on the underside of the lowermost ring and the sheet of paper is greater than the relatively weak bond between the undersurface of the reinforcement ring located immediately thereabove and the upper surface of the lowermost reinforcement ring. Consequently, the lowermost ring is left attached to the sheet of paper, while all reinforcement rings above the lowermost ring are lifted upwardly as the die punch is withdrawn from the paper.

As a practical matter, however, it is likely that some of the weak bonds between rings in the stack will fail, and some of the reinforcement rings may drop off the punching tip of the die punch if the punching tip has the same diameter as the die punch shank. Therefore, in a preferred construction, the die punch tip has a somewhat greater cross-sectional area than the shank above it and a slightly greater diameter than the openings through the reinforcement rings. Consequently, the shoulder formed at the transition between the die punch tip and the die punch shank prevents the reinforcement rings from dropping off of the lower end of the die punch.

In a preferred embodiment of the invention, the lower die punch member is comprised of a transverse pressure plate located atop a cylindrical shank that depends therefrom. The stack of reinforcement rings is disposed on the cylindrical shank. Preferably, the cross-sectional area of the punching tip is slightly greater than that of the shank and an upwardly inclined shoulder is formed at the demarcation between the punching tip and the shank. The shoulder may be formed with a frustoconical surface having a sloping angle of between about ten degrees and about twenty degrees relative to the vertical axis of the die punch shank. In a preferred construction in which the diameter of the openings in the reinforcement rings is six or seven millimeters, the slope of the frustoconical surface of the shoulder at the transition between the shank and the punching tip is fourteen degrees, two minutes, and the diameter of the punching tip is between 0.05 and about 1.00 millimeters greater than the diameter of the shank. The diameter of the die punch shank should be between about 0.05 and about one-half millimeter less than the diameter of the opening through the reinforcement rings mounted upon it.

Each reinforcement ring is preferably constructed as a flat, circular, annular disc of polyethylene terephthalate (PET) having a circular outer diameter of fourteen and a half millimeters and a circular, central aperture therethrough of six or seven millimeters. Each PET ring is preferably about 0.05 millimeters in thickness.

Preferably the lower surface of each of the reinforcement rings has a plurality of raised protrusions thereon, which may be formed of polypropylene (PP). These protrusions serve as spacers to reduce the extent to which the adhesive coating on the underside of the reinforcement rings is forced into intimate contact with the sprayed silicone coating on the upper side of the reinforcement ring located immediately therebeneath. These protrusions may be formed as a plurality of linearly extending, raised ribs that intersect each other in a right-angles to delineate a square grid.

In another aspect the invention may also be considered to be an improvement in a combination hole punching and reinforcing device for punching holes in sheets of material using a die punch and for concurrently reinforcing the sheets of material about the holes therein. According to the improvement of the invention the die punch is configured with a punching tip at its lower extremity and a shank narrower than the punching tip projecting upwardly therefrom, and a transverse pressure plate located on the shank. The invention also includes reinforcement rings that have central openings therethrough slightly smaller than the punching tip. The reinforcement rings have undersurfaces coated with pressure-sensitive adhesive. The reinforcement rings are carried by the shank stacked beneath the pressure plate and above the punching tip for sequential application to the sheets of material.

In still another aspect the invention may be considered to be a combination hole puncher and reinforcer comprising: a base, a pair of stanchions projecting upwardly from the base, vertical guides mounted on each of the stanchions, a separate punching ram mounted in each of the guides, an operating lever coupled to the punching rams, a die punch for each of the rams, each die punch having a shank with a broadened tip at its lower extremity, and a transverse pressure plate located on the shank of each die punch above the broadened tip thereof. A plurality of annular reinforcement rings are mounted atop the die punching tip shanks of the die punches between the broadened lips and the transverse pressure plates.

The base has a flat upper surface with a pair of die-receiving openings defined therein. The stanchions form edge stops for positioning a sheet of material on the flat upper surface of the base. The vertical guides are mounted vertically above the die-receiving openings in the flat upper surface of the base and are laterally displaced from the edge stops.

The punching rams each have a lower end mounted in each of the guides and laterally constrained by the guides. The operating lever has a fulcrum axis at the stanchions that is parallel to the flat upper surface of the base. The operating lever moves the punching rams together in vertical reciprocation within the guides.

The die punches are preferably detachably attached to the lower ends of the punching rams. The broadened tips fit closely within the die-receiving openings in the upper surface of the base. The transverse pressure plates are located on the shanks of the die punches and above the broadened tips thereof. The upper surfaces of the pressure plates may be provided with releaseable couplings, such as threaded studs, that engage the lower ends of the punching rams.

The reinforcement rings each have a central opening therethrough that is of a cross-sectional area slightly less than that of the broadened tips of the die punches and slightly greater than that of the die punch shanks. Each reinforcement ring has an undersurface coated with a pressure-sensitive adhesive. The reinforcement rings are mounted on the die punch shanks between the broadened tips and the transverse pressure plates thereof.

The invention may be described with greater clarity and particularity by reference to the accompanying drawings.

DESCRIPTION OF THE EMBODIMENT

Figure 1:
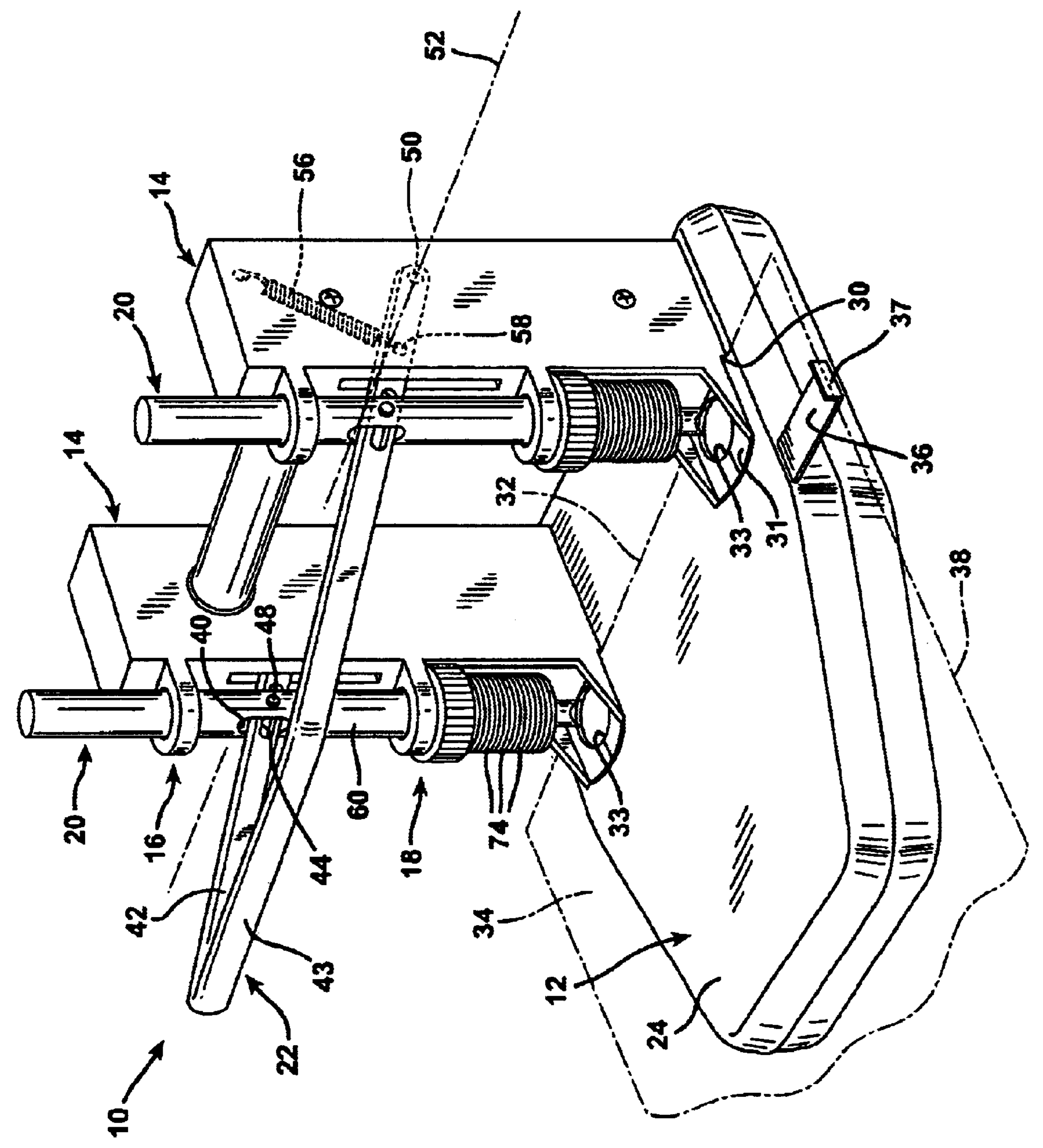
FIG. 1 is a perspective view illustrating a preferred embodiment of a combination hole puncher and reinforcer according to the invention.
Figure 2A:
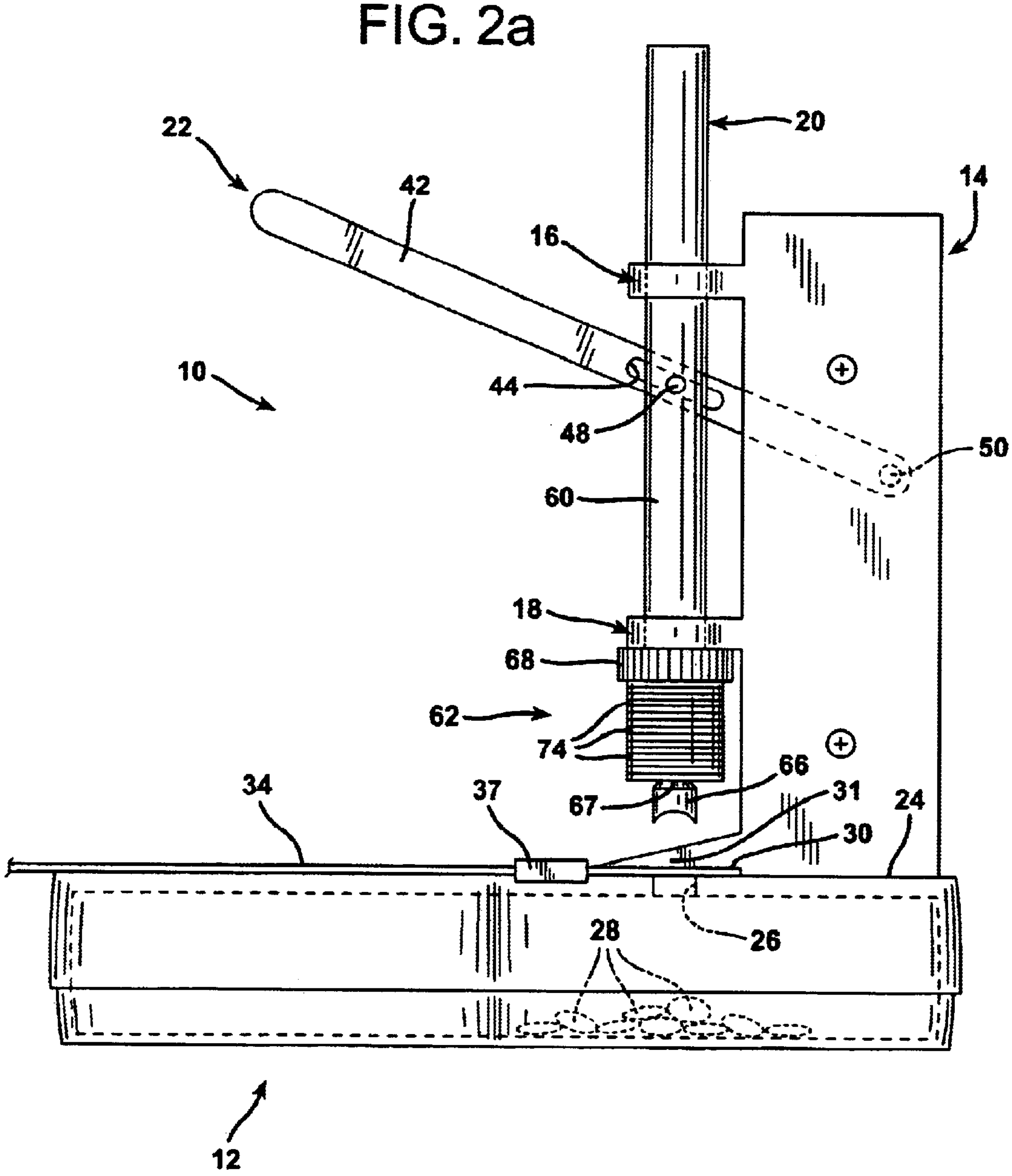
FIG. 2*a* is a side elevational view of the hole puncher and reinforcer of FIG. 1 shown with the die punch rams in a raised condition.
Figure 3A:
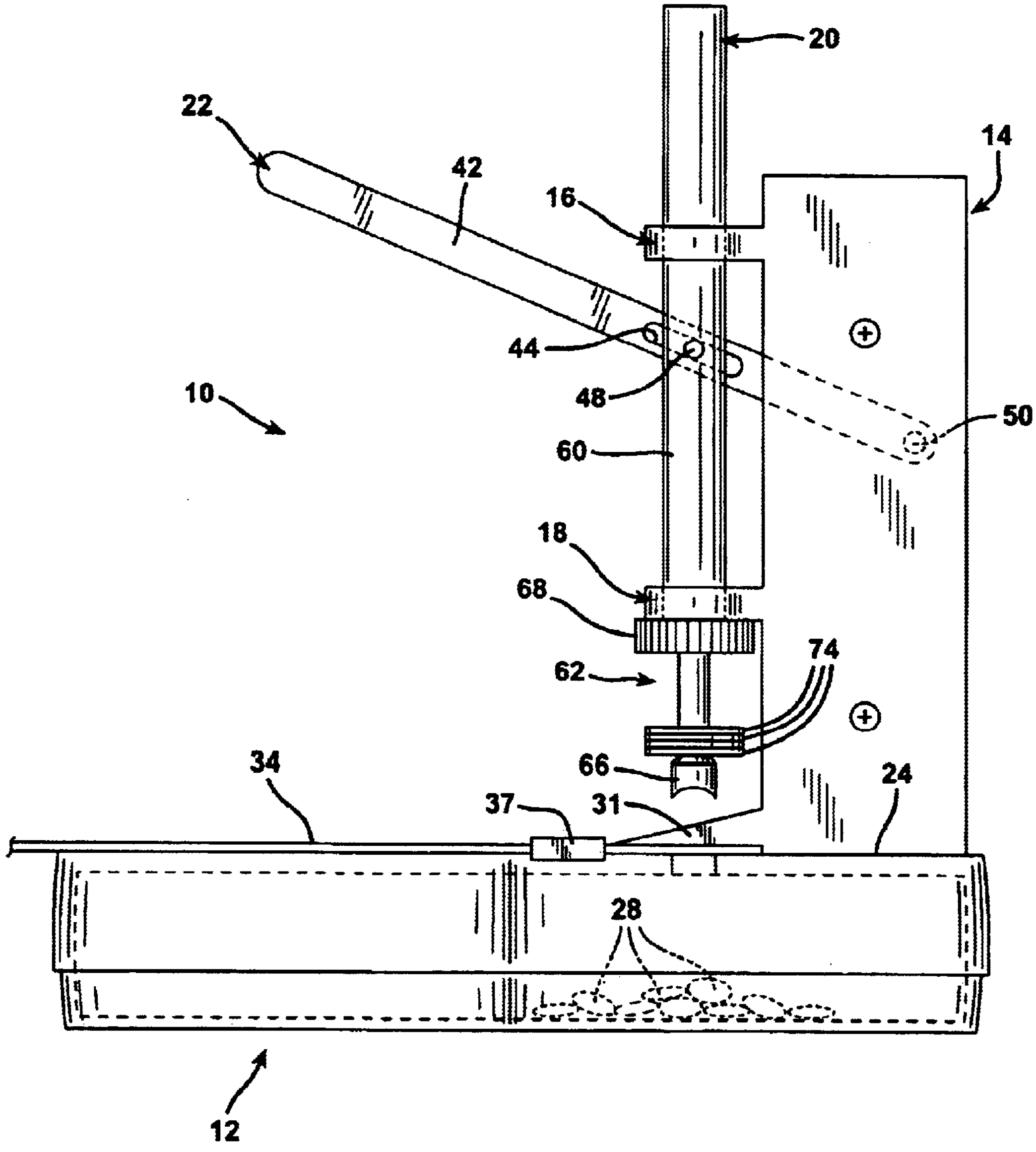
FIG. 3*a* is a side elevational view illustrating the hole puncher and reinforcer of FIG. 1 with a diminished supply of reinforcement rings and with the rams in a raised position.
Figure 3B:
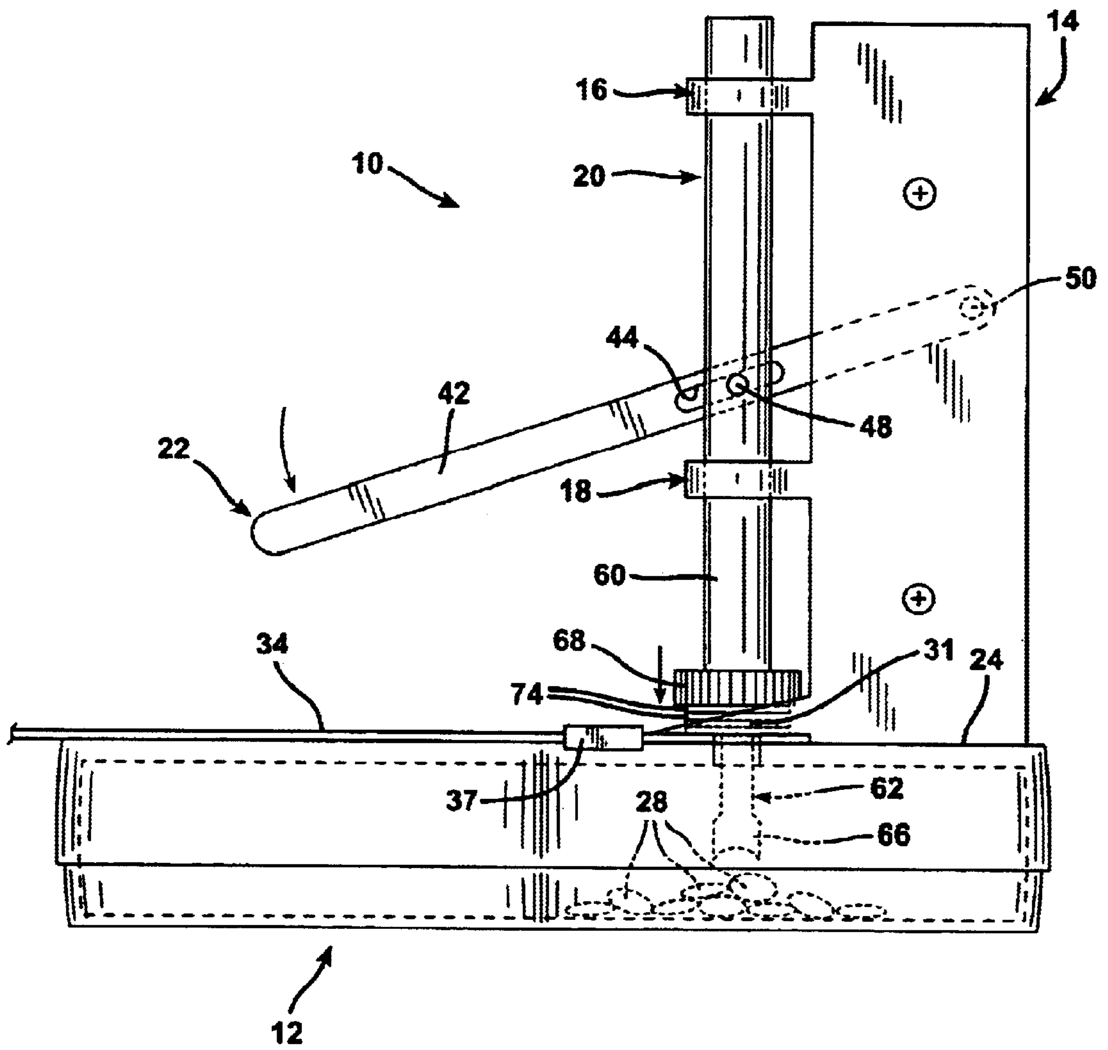
FIG. 3*b* illustrates the hole puncher and reinforcer of FIG. 3*a* operated to apply reinforcement rings to a sheet of paper.
Figure 4:
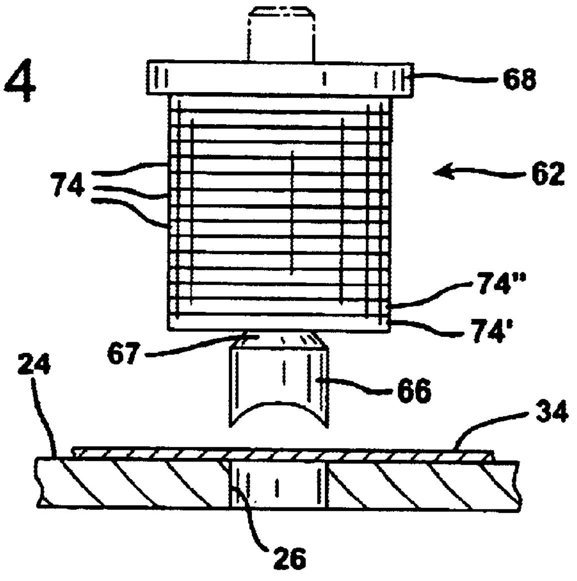
FIG. 4 is a side elevational detail illustrating one of the removable die punches of FIG. 1 in a raised position above a sheet of paper.
Figure 6:
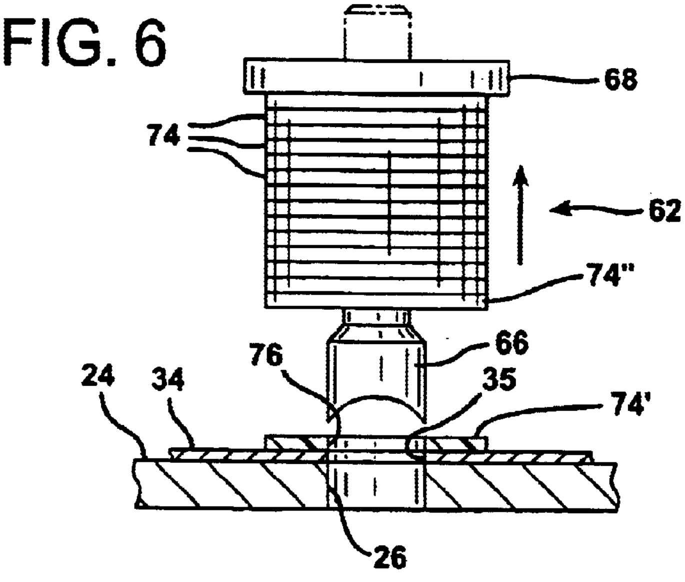
FIG. 6 is a side elevational detail that illustrates the die punch of FIG. 5 raised after applying a reinforcement ring to the sheet of paper.

FIG. 1 illustrates a combination hole puncher and reinforcer generally at 10. The hole puncher and reinforcer 10 is a mechanical, manually operated device that has several component elements. The device 10 includes a base 12, a pair of stanchions 14 which are laterally spaced apart from each other and mounted atop the base 12, pairs of upper and lower guide loops 16 and 18, respectively, a pair of punching rams 20, and a U-shaped operating lever 22. The base 12 serves as a stabilizing support and has a flat, bright, electroplated upper deck 24. A pair of laterally spaced die-receiving openings 26 are defined through the structure of the flat, bright, electroplated upper deck 24, as illustrated in FIGS. 2*a*, 4, and 6. The pair of stanchions 14 project upwardly from the deck 24 in perpendicular orientation thereto and are anchored to the base 12. The interior of the base 12 below the deck 24 is hollow so as to define a cavity to receive punched chads of papers, illustrated in phantom in FIGS. 2*a*–3*b* and in FIG. 14.

The stanchions 14 form edge stops 30 against which an edge 32 of a sheet paper 34 (indicated in phantom in FIG. 1) registers in abutting relationship. Each stanchion 14 has a forwardly projecting foot 31 with a large circular opening 33 therethrough extending out above the edge stops 30 at a spaced distance above the deck 24. A side edge positioning slide 36 having a side edge stop tang 37 projecting upwardly therefrom is mounted to the base 12 just beneath the deck 24. The side edge positioning slide 36 may be retracted into or withdrawn from the base 12 and serves as a stop for positioning the side edge 38 of the sheet of paper 34.

Each pair of upper and lower guide loops 16 and 18 forms a vertical guide for a separate one of the stanchions 14. The guide loops 16 and 18 project forwardly from the stanchions 14, as viewed in FIG. 1. The paired sets of guide loops 16 and 18 forming the vertical guide for each stanchion, are located vertically above the die-receiving openings 26 in the flat upper deck 24 of the base 12 and above the larger openings 33 in the feet 31 that extend out from the stanchions 14. The central, vertical axes of the guide loops 16 and 18 are laterally displaced from the edge stops 30.

The punching rams 20 are formed as vertically oriented, solid steel rods each having an elongated opening 40 defined therethrough. The openings 40 in the punching rams 20 are vertically elongated and receive the opposing lever arms 42 of the U-shaped operating lever 22 therethrough. The lever arms 42 are joined together by a cross member 43. Longitudinally elongated slots 44 are defined through each of the lever arms 42. A transverse guide pin 48 is inserted into a pair of diametrically opposed openings in each of the punching rams 20, midway along the length of the vertically elongated slot 40 thereof. The pins 48 also pass through the longitudinally elongated openings 44 defined in the lever arms 42 of the operating lever 22. The distal ends of the lever arms 42 are secured by fulcrum pins 50 within the structures of the stanchions 14 to define a fulcrum axis 52 for the lever 22. The fulcrum axis 52 is located at the stanchions 14 and is parallel to the flat upper surface 24 of the base 12 and perpendicular to both of the vertical stanchions 14.

Figure 2B:
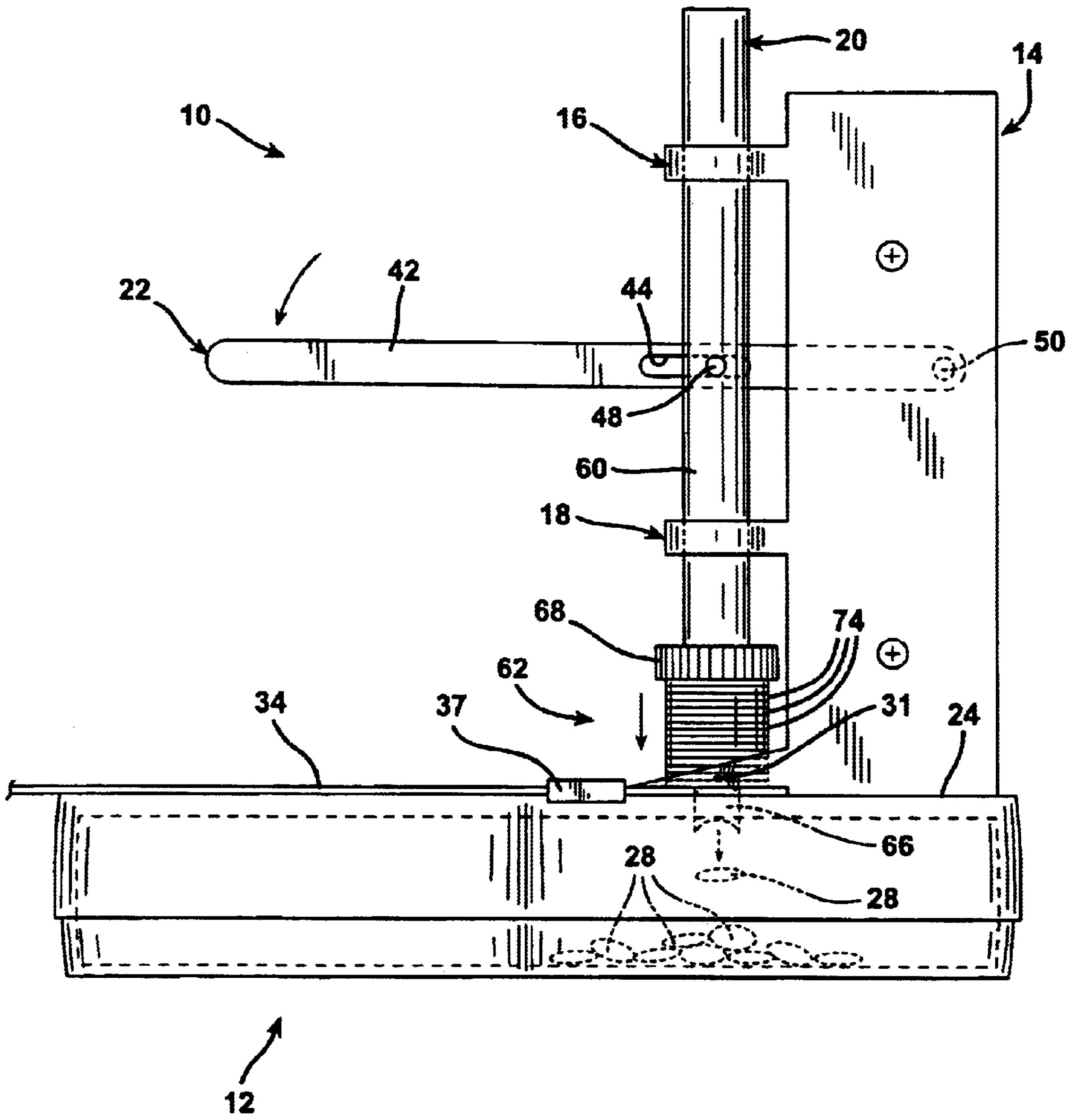
FIG. 2*b* illustrates the hole puncher and reinforcer applying a reinforcement ring to a sheet of paper from a full supply of reinforcement rings.

The operating lever 22 is biased upwardly away from the deck 24 by a pair of springs 56. Each of the springs 56 is located within a separate one of the stanchions 14. One end of each spring 56 is anchored within the stanchion 14, while the other end is hooked through an opening 58 in its associated lever arm 42 to bias the operating lever 22 upwardly and away from the base 12. The operating lever 22 is raised by the springs 56, as illustrated in FIGS. 1, 2*a*, and 3*a*, to withdraw the punching rams 20 upwardly. Alternatively, the operating lever 22 may be forced downwardly, as illustrated in FIGS. 2*b* and 3*b*, to force the punching rams 20 downwardly, thereby overcoming the upwardly biasing force of the pair of coil springs 56.

Figure 7:
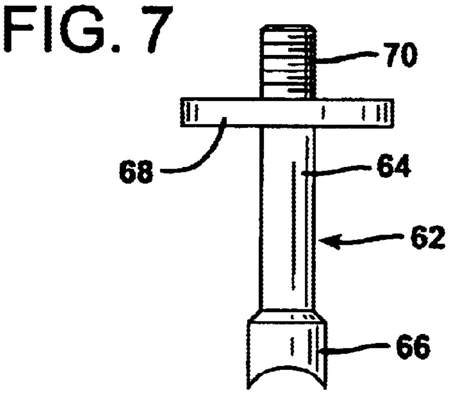
FIG. 7 illustrates one embodiment of a die punch according to the invention shown in isolation from its reinforcement rings.

Each of the punching rams 20 has a lower end 60 that terminates in a die punch 62, one of which is illustrated in isolation in FIG. 7. Each of the die punches 62 is formed of a hard plastic substance and has a narrow, cylindrical shank 64 with a broadened punching tip 66 at its lower extremity. A transverse, disc-shaped pressure plate 68 is located on the shank 64 at the upper extremity of each of the die punches 62. The transverse pressure plates 68 are located atop the shanks 64 of the die punches 62 and above the broadened tips 66 thereof.

The die punches 62 are detachable from the punching rams 20 and are releaseably coupled thereto by means of some type of releaseable fastening system. In the embodiment of the invention illustrated in FIGS. 7 and 8, each of the die punches 62 is provided with an upwardly projecting, externally threaded stud 70 that may be threadably engaged with an internally tapped socket 72 defined within the lower end 60 of each of the cylindrical punching rams 20. As is evident in FIG. 8, the threaded studs 70 of the die punch 62 may be screwed into the internally threaded socket 72 at the lower end 60 of a punching ram 20 until the upper surface of the disc-shaped pressure plate 68 resides in abutment against the edge of the lower end 60 of the cylindrical punch 20.

A plurality of annular reinforcement rings 74, each having a central, circular opening 76 therethrough are mounted on the shanks 64 of each of the die punches 62. The shanks 64 are long enough to accomodate a considerable number of reinforcement rings 74 stacked one atop another in vertical, coaxial alignment with each other. Preferably, the shank 64 is long enough to accommodate two hundred of the reinforcement rings 74.

The central, axial opening 76 defined through each of the reinforcement rings 74 has a diameter and cross-sectional area slightly less than the diameter and cross-sectional area of the broaden tips 66 of the die punches 62. The undersurface of each reinforcement ring 74 is coated with a pressure-sensitive adhesive, as will hereinafter be described. The reinforcement rings 74 are mounted on the die punch shanks 64 between the broadened tips 66 and the transverse pressure plates 68 of the die punches 62.

The cylindrical shank 64 of each die punch 62 depends from the underside of the pressure plate 68. The punching tip 66 has a cross-sectional area somewhat greater than that of the cylindrical shank 64 and only slightly greater than the cross-sectional area of the circular opening 76 in each of the reinforcement rings 74.

Figure 10:
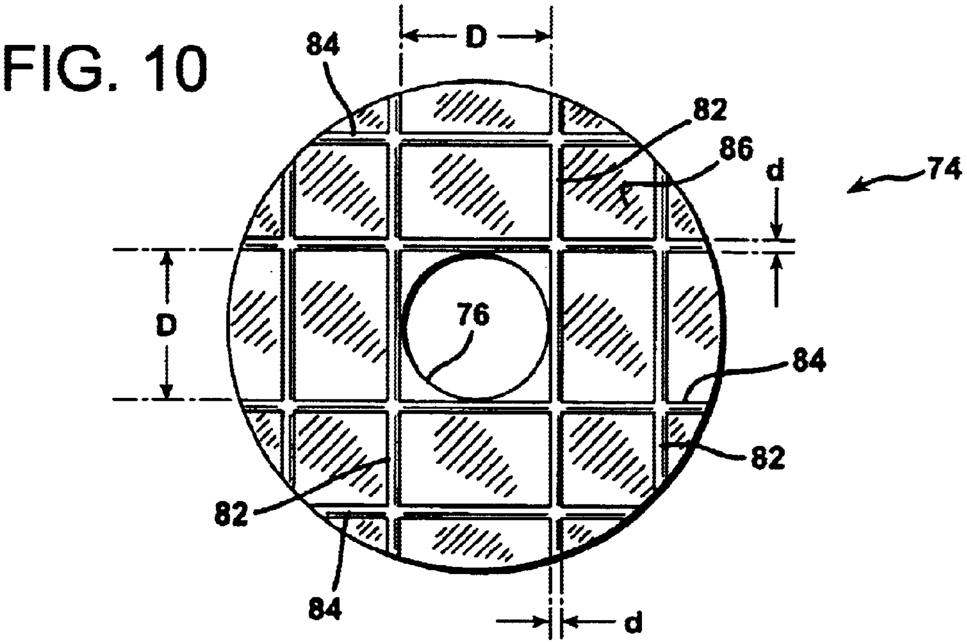
FIG. 10 is a bottom plan view illustrating a single one of the reinforcement rings employed in the invention.
Figure 11:
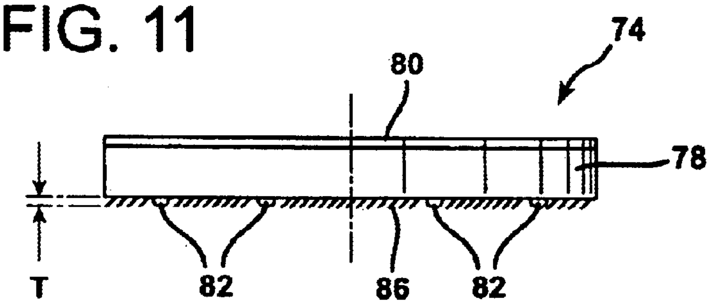
FIG. 11 is a side elevational view of the reinforcement ring of FIG. 10, still shown in isolation.

FIGS. 10 and 11 are enlarged, detail views showing the construction of a single one of the reinforcement rings 74. FIG. 10 is a plan view illustrating the undersurface of one of the reinforcement rings 74. The outer diameter of the reinforcement ring 74 is preferable fourteen and a half millimeters, while the diameter of the central aperture 76 through the reinforcement ring 74 is typically either six millimeters or seven millimeters, which are the standard sizes for use with conventional ring binders and prong fasteners.

As shown in the side elevational view of FIG. 11, each reinforcement ring 74 is comprised of an annular disc 78, preferably formed of polyethylene terepthalate (PET) which is preferably 0.05 millimeters in thickness. The PET disc 78 has an upper surface that is coated with a thin layer 80 of silicone. The silicone layer 80 is sprayed onto the upper surface of the PET disc 78 and adheres thereto to make the upper surface of the reinforcement ring very slick and adhesive resistant. That is, pressure-sensitive adhesive does not readily adhere to the silicone layer 80.

During fabrication, the reinforcement rings 74 are turned upside down and a rectilinear grid in the form of a mesh of polypropylene (PP) is laid upon the annular surface of the PET disc 78 opposite the surface upon which the silicone layer 80 is coated. The PP grid is formed of a rectilinear array of ribs or ridges 82 and 84 that intersect each other at right angles. The mesh grid formed by the PP ribs 82 and 84 has square openings, preferably two millimeters on a side, indicated by the distance D in FIG. 10. That is, the mutually parallel ribs 82 are separated by a distance of two millimeters. Similarly, the mutually parallel ribs 84 are separated from each other by a distance of two millimeters. The ribs 82 and 84 are each 0.2 millimeters in width, as indicated by the distance d in FIG. 10. The mesh from which the rectilinear grid or matrix of ribs 82 and 84 is cut has a thickness of 0.01 millimeters. Consequently, the ribs 82 and 84, and the grid formed by those ribs, has a thickness of 0.01 millimeters, as indicated by the distance T in FIG. 11.

The rectilinear grids are die cut by a circular, annular cutter from mesh material. That cutter has the same outer diameter as the outer diameter of the reinforcement rings 74 and the same inner diameter as the diameter of the central openings 76 in the reinforcement rings 74. A coating of pressure-sensitive adhesive or glue, indicated at 86, is then laid upon the undersurface of each reinforcement ring 74 in the square openings in the grid of intersecting PP ribs 82 and 84.

Figure 12:
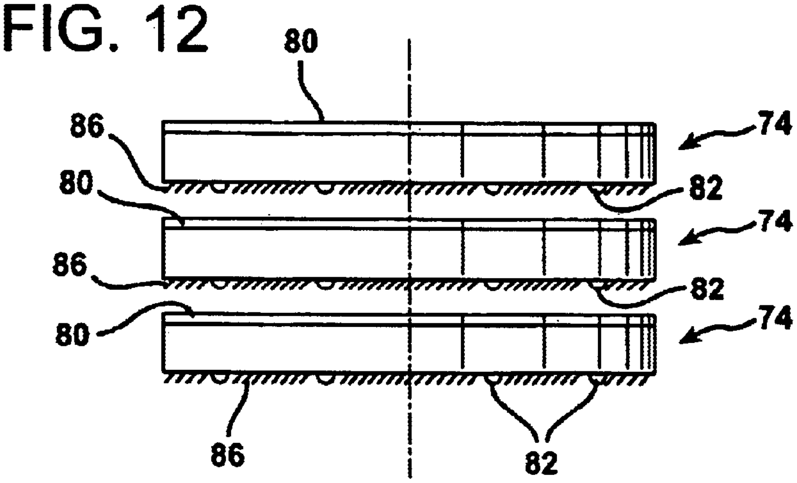
FIG. 12 is an exploded side elevational view illustrating several of the stacked reinforcement rings in isolation from the die punch.
Figure 13:
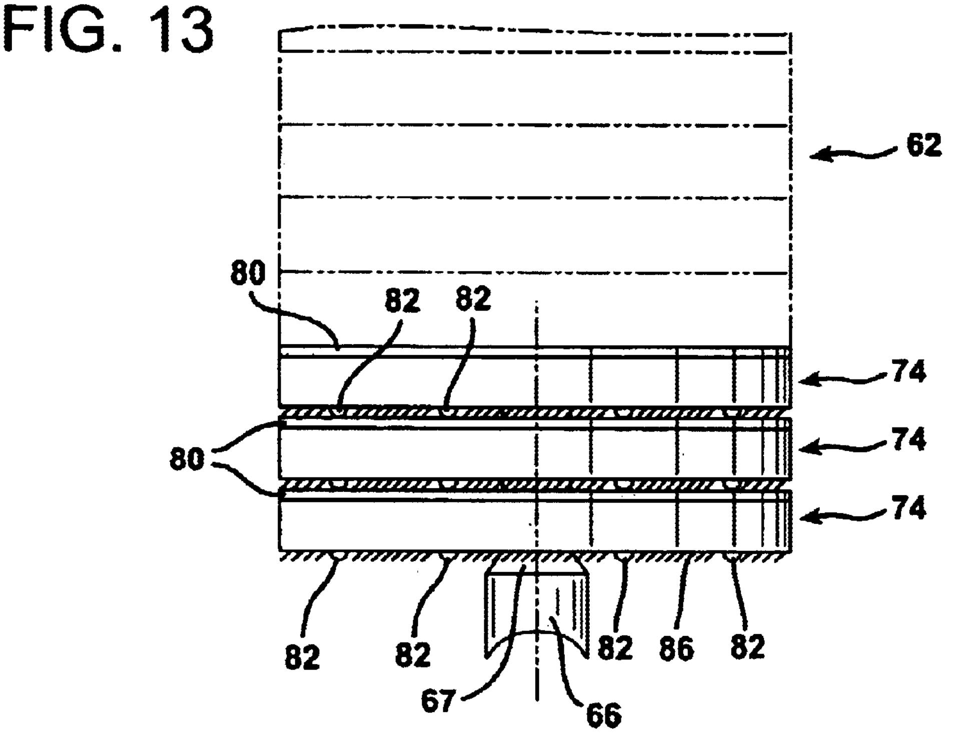
FIG. 13 is a side elevational detail illustrating the reinforcement rings of FIG. 12 mounted on a die punch as used in the puncher and reinforcer of FIG. 1.

As illustrated in FIGS. 12 and 13, the reinforcement rings 74 are stacked one atop another with the upper surface bearing the silicone release coating 80 facing upwardly, and the undersurface bearing the grid formed by the ribs 82 and 84 and also the layer of adhesive 86 facing downwardly. A plurality of the stacked reinforcement rings 74, preferably a quantity of two hundred, are mounted upon each die punch 62 by forcing the stack of reinforcement rings 74 past the punching tip 66 and onto the shank 64. The PET discs 74 are sufficiently flexible so that they can be forced past the punching tip 66 even though the outer diameter of the punching tip 66 is slightly greater than the inner diameter of the central aperture 76 through each of the reinforcement rings 74.

When the stack of reinforcement rings 74 are mounted upon the die punch 62 in this manner, they appear as a column formed of a multiplicity of thin, washer-shaped rings as illustrated in FIGS. 4 and 13.

Each of the stanchions 14 is formed with an outwardly directed restraining foot 31 having a central opening 33 therethrough that is greater in diameter than the outer diameter of the reinforcement rings 74. The restraining foot 31 serves to prevent the sheet of paper 34 from being lifted when the lever 22 is released and the springs 56 retract the punching rams 20 upwardly following the downward punching and reinforcement ring application stroke.

Figure 8:
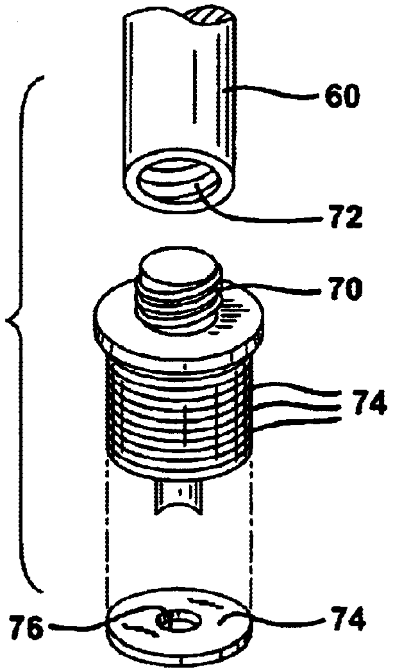
FIG. 8 is a perspective view illustrating the die punch of FIG. 7 with a plurality of reinforcement rings mounted thereon and showing its manner of attachment to a punching ram.

FIGS. 2*a* and 2*b* illustrate the operation of the combination puncher and reinforcer 10 when that device has been loaded with a fresh supply of reinforcement rings 74 mounted on the pair of disposable die punches 62. As shown in FIG. 2*a*, each die punch 62, loaded with a quantity of stacked reinforcement rings 74 is screwed onto the lower end 60 of the punch ram 20, as indicated in FIG. 8, and as previously described. The springs 56 draw the operating lever 22 upwardly so that the punching tips 66 of the two die punches 62 mounted on the lower ends 60 of the punching rams 20 are above the restraining feet 31 of the stanchions 14, as shown in FIG. 2*a*. A sheet of paper 34 is then pushed into position beneath the retaining feet 31 and up against the end stops 30 formed by the stanchions 14 and up against the side stop formed by the tang 37 of the side edge positioning slide 36. The user then grasps the cross member 43 of the operating lever 22 and forces it downwardly, as illustrated in FIG. 2*b*, overcoming the bias of the springs 56.

The longitudinally elongated slots 44 in the lever arms 42 serve as guideways for the transverse pins 48 which force the punching ram 20 downwardly. The lower extremities of the punching tips 66 of the die punches 62 are sharp enough to punch a pair of laterally spaced circular holes 35 through the sheet of paper 34. The punching tips 66 pass through the plane of the upper deck 24 of the base 12 and through the apertures 26 therein.

With continued downward movement, the lowermost reinforcement rings 74 on the pair of die punches 62 are brought into face-to-face contact with the upper surface of the sheet of paper 34 in the area thereof immediately surrounding the apertures 35 in the sheet of paper 34 created by the punching tips 66. The pressure-sensitive adhesive layers 86 on each of the lowermost reinforcement rings 74 are tightly pressed against the upwardly facing surfaces of the sheet of paper 34, surrounding the apertures 35 created therein, due to the downward force applied by the disc-shaped pressure plates 68 through the stack of reinforcement rings 74 located therebeneath. The downward motion of one of the die punches 62 is illustrated in detail in FIGS. 4 and 5.

With the application of pressure to the lowermost reinforcement ring 74 by the pressure plate 68 through the stack of reinforcement rings 74 above, the lowermost reinforcement ring 74 tightly adheres to the sheet of paper 34. Consequently, when the operating lever 22 is released and the die punches 62 are drawn upwardly by the punching rams 20, the lowermost reinforcement ring 74, indicated at 74' in FIGS. 4, 5, punching rams 20, the lowermost reinforcement ring 74, indicated at 74' in FIGS. 4, 5, and 6, and in FIGS. 13, 14, and 15, remains adhesively attached to the upper surface of the sheet of paper 34 due to the presence of the adhesive layer 86 on the underside of the lowermost reinforcement ring 74'.

The next lowest reinforcement ring 74" is easily drawn free from the lowermost reinforcement ring 74' due to the presence of the silicone layer 80. The pressure-sensitive adhesive 86 on the undersurface of the reinforcement ring 74" forms only a very weak bond with the silicone layer on the top of the reinforcement ring 74', which is easily broken by the upward force of the punching tip 66 against the inner periphery of the reinforcement ring 74" about the central opening 76 therethrough.

Figure 14:
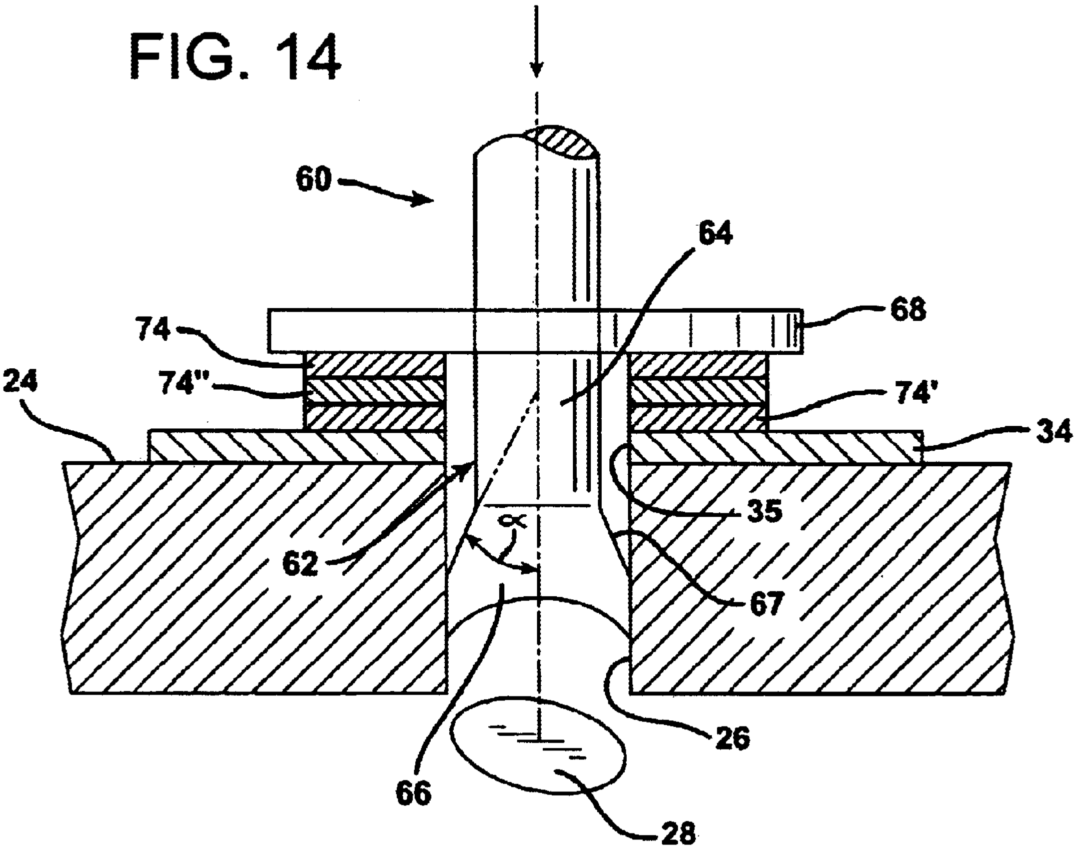
FIG. 14 is a diagrammatic sectional elevational detail illustrating the die punch with rings mounted thereon as in FIG. 13 during the downward stroke of a punching ram.
Figure 15:
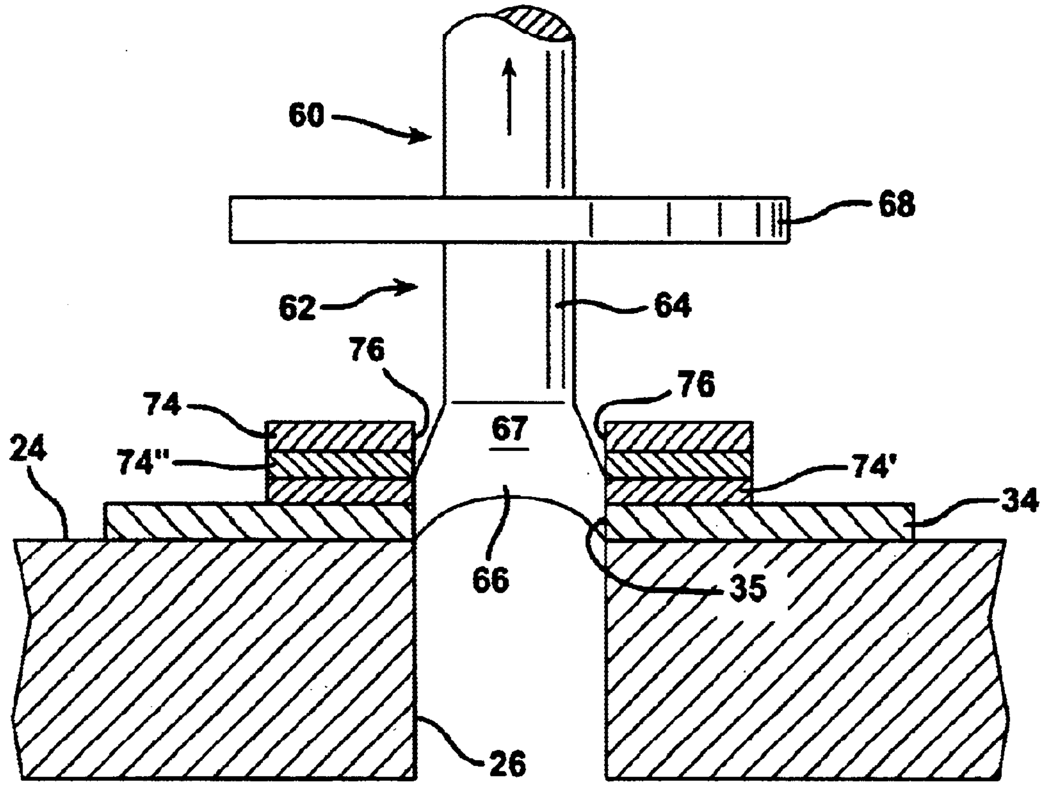
FIG. 15 is a diagrammatic sectional detail that illustrates the withdrawal of the die punch tip from the position of FIG. 14.

As best illustrated in FIGS. 14 and 15, a shoulder 67 is formed at the transition between the punching tip 66 and the die punch shank 64. The shoulder 67 is preferably formed with an upwardly facing, generally frustoconical surface configuration. The angle of slope of the frustoconical surface 67 is quite important and will vary, depending upon the diameters of the punching tip 66 and the central aperture 76 in the reinforcement rings 74, as well as upon the strength of the pressure-sensitive adhesive 86. Preferably, the angle $\alpha$ formed between the shoulder 67 and the surface of the cylindrical shanks 64, as well as the axis of the die punch 62 and the punching ram 20, is typically between about ten degrees and about twenty degrees. For the structure of the die punch 62 and the reinforcement rings 74 described in the preferred embodiment of the invention, the angle $\alpha$ is about fourteen degrees, two minutes. punches out a circular chad 28 that drops into the cavity of the base 12 beneath the upper deck 24 thereof. The pressure plate 68 presses the adhesive layer 86 of the lowermost reinforcement ring 74 against the upper surface of the sheet of paper 34, thereby tightly adhesively securing the lowermost reinforcement ring 74' to the sheet of paper 34 about the opening 35 therein.

The downwardly projecting, raised protrusions formed by the grid of ribs 82 and 84 serve as spacers that prevent the adhesive layer 86 of the reinforcement ring 74" located immediately above the lowermost reinforcement ring 74' from being tightly pressed against the upper surface of the lowermost reinforcement ring 74'. This aids the silicone layer 80 in causing the reinforcement ring 74" to easily release from the lowermost reinforcement ring 74' as the punching tip 66 is raised.

Figure 5:
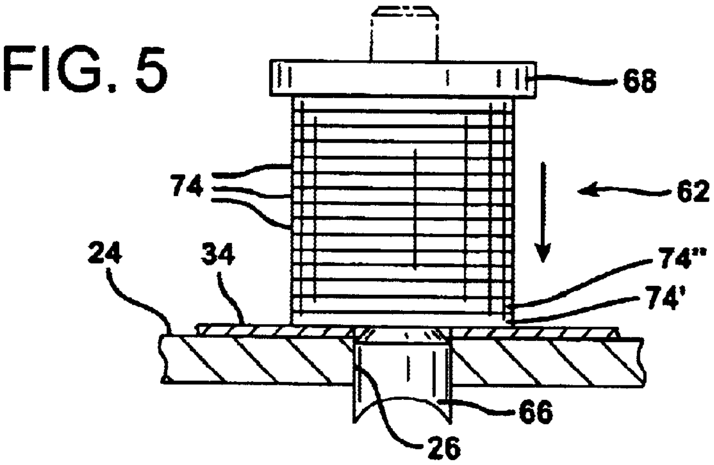
FIG. 5 is a side elevational detail illustrating the die punch of FIG. 4 lowered to press the lowermost reinforcement ring against the sheet of paper.

As illustrated in FIGS. 14 and 15, and also in FIGS. 5 and 6, when the punching tip 66 is drawn upwardly, the force of adhesion between the layer of adhesive 86 on the lowermost reinforcement ring 74' and the sheet of paper 34 is quite strong. The adhesive bond is sufficiently strong so that even though the diameter of the punching tip 66 is slightly larger than the central opening 76 through the reinforcement ring 74', the upward force of the shoulder 67 against the lowermost reinforcement ring 74' merely widens the opening 76 thereof. The punching tip 66 thereby passes through that opening, as illustrated in FIG. 15.

However, the adhesive force between the adhesive layer 86 on the next lowest reinforcement ring 74" and the silicone layer 80 atop the lowermost reinforcement ring 74' is so weak that the shoulder 67 of the punching tip 66 engages the inner periphery of the next lowest reinforcement ring 74" and lifts that reinforcement ring, along with all of the remaining reinforcement rings stacked above it, upwardly away from the lowermost reinforcement ring 74', as illustrated in FIGS. 6 and 15. The detachment of the undersurface of the next lowest reinforcement ring 74" from the upper surface of the lowermost reinforcement ring 74' is aided by the spacing effect provided by the mesh grid formed by the ribs 82 and 84.

Furthermore, since that mesh grid is not attached to the undersurface of the next lowest reinforcement ring 74", it remains in position atop the upper surface of the lowermost reinforcement ring 74' when the remaining stack of reinforcement rings 74 are drawn upwardly in the manner illustrated in FIGS. 6 and 15. Consequently, as each reinforcement ring 74 is attached to a sheet of paper 34, the spacing grid formed by the ribs 82 and 84 previously sandwiched in between the attached reinforcement ring and the reinforcement ring immediately above it drops away from the next lowest reinforcement ring as that ring is raised. As a result, as that next lowest reinforcement ring becomes the lowermost reinforcement ring, the spacing ribs 82 and 84 no longer remain on its underside to interfere with adhesion of the pressure-sensitive adhesive layer 86 when that reinforcement ring is pressed against a subsequent sheet of paper or other sheet of material. Even if the PP grid does not fall away from the next lowest reinforcement ring, it does not seriously affect adhesion of the pressure-sensitive adhesive 86 to a sheet of paper 34 as it does with respect to the silicone layer 80.

The reinforcement rings 74 are sequentially applied, one after another, until the stack of reinforcement rings 74 is reduced in height, as is evident from a comparison of FIGS. 2*a* and 2*b* with corresponding FIGS. 3*a* and 3*b*. As indicated in those drawing figures, the shorter the stack of reinforcement rings 74 remaining on the die punch 62, the longer will be the stroke of the operating lever 22 in order to supply sufficient pressure to attach the lowermost reinforcement ring 74' to a sheet of paper 34 atop the deck 24 of the base 12. However, this increase in the length of the stroke of the operating lever 22 is of no particular consequence, since the longitudinal slots 44 in the lever arms 40 are long enough to accomodate both the greatest and shortest stack of reinforcement rings 74 that can be mounted or remain on the die punch 62.

It should be noted that as each reinforcement ring 74 is applied to the sheet of paper 34 through the openings 33 in the feet 31, there may be a tendency for the sheet of paper 34 to be raised along with the punching tips 66. However, the laterally projecting feet 31 prevent the sheet of paper 34 from being lifted to any significant extent from the deck 24 of the base 12.

By finishing the deck 24 with a bright electroplating finish, the combination puncher and reinforcer 10 is provided with an upwardly facing deck surface 24 to which the pressure-sensitive adhesive 86 will not readily adhere even if the device 10 is advertently operated without a sheet of paper 34 in position. Should this happen, the lowermost reinforcement ring 74' may or may not detach from the next lowest reinforcement ring 74". However, even if it does, it may be easily swept off of the bright electroplated deck 24, since it will exert only a weak bond therewith.

The die punch 62 is configured for use as a disposable item. Once all of the reinforcement rings 74 have been dispensed therefrom and attached about punched holes in sheets of paper 34, the empty die punch 62 illustrated in FIG. 7 is unscrewed from the lower end 60 of the ram 20 and discarded. A fresh, fully loaded die punch 62 is then screwed onto the lower end 60 of the punching ram 20. The die punch 62 thereby serves as a disposable magazine for a supply of reinforcement rings 74.

Figure 9:
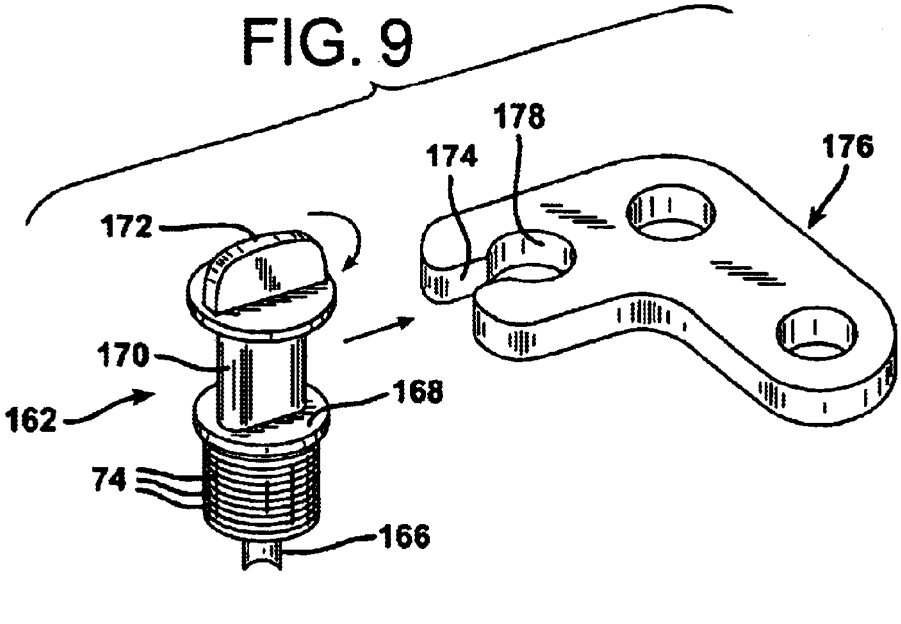
FIG. 9 is a perspective detail illustrating an alternative embodiment of a die punch to that shown in FIGS. 7 and 8.

The threaded stud and socket arrangement illustrated in FIGS. 7 and 8 is only one of various systems by which a detachable punching die may be secured to ram cylinder 20. An alternative system is illustrated in FIG. 9. In that system a detachable die punch 162 has a horizontally oriented pressure plate 168 from which an upwardly projecting mounting post 170 of oblong cross section extends. A twist key 172 is located at the top of the mounting post 170. The mounting post 170 fits into a slot 174 in an L-shaped ram cylinder coupling plate 176. The underside of the disc-shaped base of the twist key 172 resides in contact with the upper surface of the coupling plate 176, while the upper side of the pressure plate 168 resides in contact with the undersurface of the coupling plate 176. Once the mounting post 170 has been inserted into the slot 174, the twist key 172 is rotated ninety degrees so that the oblong-shaped mounting post 170 is entrapped within the opening 178 of the coupling plate 176. The coupling plate 176 moves in vertical reciprocation with the cylindrical ram 20. Also, in the embodiment of FIG. 9 the punching tip 166 has the same diameter as the shank of the die punch 162.

Undoubtedly, numerous variations and modifications of the invention will become readily apparent to those familiar with office products. For example, different ram and lever mechanisms may be substituted for those illustrated in the preferred embodiments of the invention. Also, the die punch may be constructed as a fixed lower extremity of the punching ram 20, and is not necessarily disposable. In addition, while the preferred embodiment of the invention employs a punching tip 66 that is larger in diameter than the shank 64 of the die punch 62, the punching tip 66 can be the same diameter as the shank 64, or formed with even a smaller diameter. Accordingly, the scope of the invention should not be construed as limited to the specific embodiment depicted and described, but rather is defined in the claims appended hereto.

What is claimed is:

1. A punching and reinforcement apparatus for a combination hole puncher and reinforcer for punching holes in sheets of material and for concurrently applying reinforcement to said sheets of material about said holes therein, comprising: a lower die punch having a transverse pressure plate with a cylindrical shank depending therefrom, and a radially outwardly directed projection from said shank, and a stack of reinforcement rings disposed on said cylindrical shank above said radially outwardly directed projection, whereby said stack of reinforcement rings is supported from beneath by said radially outwardly directed projection, each reinforcement ring having an undersurface coated with a pressure-sensitive adhesive and an adhesive resistant upper surface.

2. An apparatus according to claim 1 wherein said lower die punch is formed of plastic.

3. An apparatus according to claim 1 wherein said transverse pressure plate is located atop said shank and has an upper surface with a releaseable coupling thereon.

4. An apparatus according to claim 3 wherein said releaseable coupling is a threaded connector.

5. A punching and reinforcement apparatus for a combination hole puncher and reinforcer for punching holes in sheets of material and for concurrently applying reinforcement to said sheets of material about said holes therein, comprising: a lower die punch having a transverse pressure plate with a cylindrical shank depending therefrom, wherein said lower die punch is further comprised of a punching tip having a cross-sectional area greater than that of said cylindrical shank, and a shoulder formed between said punching tip and said cylindrical shank.

6. An apparatus according to claim 5 wherein said shoulder is formed with a frustoconical surface configuration.

7. A punching and reinforcement apparatus for a combination hole puncher and reinforcer for punching holes in sheets of material and for concurrently applying reinforcement to said sheets of material about said holes therein, comprising: a lower die punch having a transverse pressure plate with a cylindrical shank depending therefrom, a stack of reinforcement rings disposed on said cylindrical shank, wherein said undersurface of each of said reinforcement rings has a plurality of raised protrusions thereon.

8. An apparatus according to claim 7 wherein said reinforcement rings are formed of polyethylene terephthalate and said raised protrusions are formed of polypropylene.

9. An apparatus according to claim 7 wherein said raised protrusions are formed as a plurality of linearly extending raised ribs.

10. An apparatus according to claim 9 wherein said raised ribs extend in equally spaced rows and columns that intersect at right angles to delineate a square grid.

11. An apparatus according to claim 7 wherein said reinforcement rings are formed of annular discs of polyethylene terephthalate and said undersurfaces thereof are provided with projecting polypropylene protrusions.

12. In a combination hole punching and reinforcing device for punching holes in sheets of material using a die punch and for concurrently reinforcing said sheets of material about said holes therein, the improvement wherein said die punch is configured with a punching tip at its lower extremity and a shank narrower than said punching tip projecting upwardly therefrom and a transverse pressure plate located on said shank and further comprising a plurality of reinforcement rings that have central openings therethrough slightly smaller than said punching tip and said reinforcement rings have undersurfaces coated with pressure-sensitive adhesive and are carried by said shank stacked beneath said pressure plate and above said punching tip for sequential application to said sheets of material.

13. A combination according to claim 12 wherein said reinforcement rings have upper surfaces that resist adherence to said pressure-sensitive adhesive.

14. A combination according to claim 13 wherein said undersurfaces of said reinforcement rings have protrusions projecting therefrom.

15. A combination according to claim 14 wherein said protrusions are formed as a grid of intersecting ridges of adhesive-resistant material.

16. A combination according to claim 15 wherein said ridges are formed of polypropylene plastic.

17. A combination according to claim 12 further comprising a ram member having a lower end and said die punch is detachable from said lower end of said ram member.

18. A combination hole puncher and reinforcer comprising:

a base having a flat upper surface with a pair of die-receiving openings defined therein, a pair of stanchions projecting upwardly from said base and forming edge stops for positioning a sheet of material on said flat upper surface of said base, a vertical guide mounted on each of said stanchions vertically above said die-receiving openings in said flat upper surface of said base and laterally displaced from said edge stops, a separate punching ram mounted in each of said guides and laterally constrained by said guides, each of said rams having a lower end, an operating lever coupled to said punching rams and having a fulcrum axis at said stanchions that is parallel to said flat upper surface, whereby said operating lever moves said punching rams together in vertical reciprocation within said guides, a die punch for each of said rams, each die punch having a shank with a broadened tip at its lower extremity, and said shanks are attached to said lower ends of said punching rams, and said broadened tips fit closely within said die-receiving openings in said upper surface of said base, a transverse pressure plate located on said shanks of each of said die punches and above said broadened tips thereof, and a plurality of annular reinforcement rings, each having a central opening therethrough that is of a cross-sectional area slightly less than that of said broadened tips and an undersurface coated with pressure-sensitive adhesive, and said reinforcement rings are mounted on said shanks of said die punches between said broadened tips and said transverse pressure plates.

19. Combination according to claim 18 wherein said die punches are detachable from said rams.

20. A combination according to claim 18 wherein said reinforcement rings each have an upper surface that is treated to resist adherence to a reinforcement ring located thereabove.

* * * * *